(12) United States Patent
Horvat et al.

(10) Patent No.: US 6,313,777 B1
(45) Date of Patent: Nov. 6, 2001

(54) BINARY WAVEFORM SHAPING APPARATUS

(75) Inventors: Dion Calvin Michael Horvat, New Westminster; Florin Gheorghe Jelea, Burnaby, both of (CA)

(73) Assignee: VTech Communications, Ltd., Hong Kong (HK)

( * ) Notice: Subject to any disclaimer, the term of this patent is extended or adjusted under 35 U.S.C. 154(b) by 0 days.

(21) Appl. No.: 09/628,208

(22) Filed: Jul. 28, 2000

(30) Foreign Application Priority Data

Aug. 5, 1999 (CA) .................................................. 2279680

(51) Int. Cl.[7] ...................................................... H04N 3/00
(52) U.S. Cl. .......................... 341/144; 341/148; 341/155; 341/172
(58) Field of Search ..................................... 341/144, 148, 341/172

(56) References Cited

U.S. PATENT DOCUMENTS 5,021,788 * 6/1991 ueki et al. ............................. 341/152
5,550,544 * 8/1996 Sakiyama et al. ..................... 341/155
5,742,247 * 4/1998 Chujo .................................... 341/144

* cited by examiner

*Primary Examiner*—Michael Tokar
*Assistant Examiner*—Lam T Mai
(74) *Attorney, Agent, or Firm*—Dick & Harris

(57) ABSTRACT

The present disclosure discloses an apparatus for generating a shaped waveform derived from a binary input signal. The apparatus receives a binary input signal and a sample clock signal. The sample clock signal changes the state of an up/down counter. The binary input signal controls the counting direction of the counter. The counter addresses a lookup table containing stored values. Also disclosed is the apparatus in which the lookup table output is converted to an analog signal by a digital-to-analog converter. The lookup table can be programmed such that the circuit output is equivalent to a filtered version of the binary input signal. The apparatus may optionally be enabled or disabled, such that the apparatus output assumes a predetermined state when disabled.

6 Claims, 2 Drawing Sheets

BINARY WAVEFORM SHAPING APPARATUS

BACKGROUND OF THE INVENTION

Electronic devices utilizing wireless digital communications techniques have become increasingly prevalent in modern society. Pagers, cellular and cordless telephones, wireless computer networks, and digital television receivers are but a few examples of technologies that are becoming more and more commonplace in everyday life. Meanwhile, the increasing popularity of portable and miniaturized electronic devices is forcing designers to meet strict performance demands while simultaneously reducing circuit board size and power consumption. Not only are designers faced with the objective of reducing circuit size and power consumption but they must also address the demand for efficient allocation and use of the frequency spectrum in view of the increase in wireless traffic over a fixed number of allocated frequency bands.

One characteristic of modulated communications signals which places constraints on the efficient use of frequency spectrum is the presence of what is known as sideband energy. Sideband energy is a byproduct of signal modulation and amplification processes. Sideband energy "lies" generally adjacent to the frequency band of the desired signal undergoing modulation and results in the creation of unwanted interference on adjacent frequencies.

One technique known in the art of digital signal communications to reduce the amount of excess sideband energy generated during modulation of a digital signal is to filter the digital signal before modulating it. By smoothing the transitions between digital high and low levels, less interfering RF energy is generated at frequencies adjacent to the desired modulated frequency signal band. Consequently, this technique allows communications channels to be placed closer together with less cross-channel interference, thereby allowing more efficient utilization of a limited frequency spectrum and increased performance of radio traffic on adjacent channels. Additionally, smoothing the digital signal transitions before modulation reduces the need for post-modulation analog filtering at RF frequencies, which is otherwise comparatively delicate and expensive.

While smoothing a digital waveform before modulation is an effective technique for increasing radio performance, prior art methods of implementing such techniques have suffered several limitations. Analog filtering methods require additional space on a circuit board, are typically less precise and flexible, and may even require amplifier components, further adding to circuit size and cost. One prior art digital technique of shaping a binary signal waveform is to apply the signal to a digital filter. Conventional digital filtering has the advantages of added precision and flexibility, compared to analog methods, and may be integrated into multifunctional ICs to eliminate the need for additional board space. However, the multipliers, adders, and memory components commonly required by a digital filter implementation necessitate use of a significant number of logic gates to implement, thereby adding complexity to IC design and increased circuit power consumption.

Accordingly, it is an object of this invention to provide an apparatus for the shaping of binary waveforms which can be implemented simply, inexpensively, and with minimal increase in power consumption. Rather than fully implementing a digital filter to process the binary input signal, the present invention stores a predetermined sequence of values, which are output consecutively, either forwards or backwards, in accordance with the state of the binary input signal. By storing only samples corresponding to a transition between binary states, the complexity and memory requirements of the resulting circuit are greatly reduced.

It is another object of this invention for the predetermined sequence of values to correspond to samples of a filtered binary state transition, such that the output of the apparatus is equivalent to the binary input signal after processing by a specifically designed filter, such as a raised cosine or Gaussian filter, while requiring less complexity than other methods of implementing filter designs.

Yet another object of this invention is the inclusion of an enable input, such that the apparatus may be alternatively enabled or disabled, such that when the enable input is placed in the disabled state, the apparatus outputs a fixed predetermined value.

These and other objects of the present invention will become apparent in view of the present specification and drawings.

SUMMARY OF THE INVENTION

This invention consists of an apparatus for creating a shaped waveform derived from a binary input signal. Specifically, this invention can be used to simply and inexpensively filter a stream of binary data.

In one embodiment of this invention, binary input data is supplied to the direction control of an up/down counter. The "count" input of the counter is connected to a sample clock. During each cycle of the sample clock, the counter either increments or decrements its state, depending upon the state of the direction control. The counter is designed such that its state may not fall below a minimum predetermined value, or exceed a maximum predetermined value. The state of the counter circuit is output to the address input of a lookup table. The lookup table outputs a predetermined value corresponding with the state of its address input.

In one embodiment of the invention, the predetermined values stored in the lookup table correspond to samples of a filtered binary state transition when output in sequential succession. Therefore, each time the binary input data changes state, the apparatus outputs the filtered transition samples, such that the output of the apparatus is equivalent to a filtered version of the binary input data signal.

In another embodiment of the invention, the lookup table output is converted to an analog signal by a digital-to-analog converter circuit, thereby generating a shaped analog data waveform without necessitating use of an analog filter design.

In yet another embodiment of the invention, the apparatus includes an enable signal, whereby the apparatus can be alternatively enabled or disabled. When placed into the disabled state, the apparatus outputs a constant value. One method of implementing the enable function is by operatively connecting the enable signal to the "load" input of the counter circuit, whereby the counter circuit loads a fixed predetermined value into its state when the enable signal is in the disabled position.

DETAILED DESCRIPTION OF THE INVENTION

Figure 1:
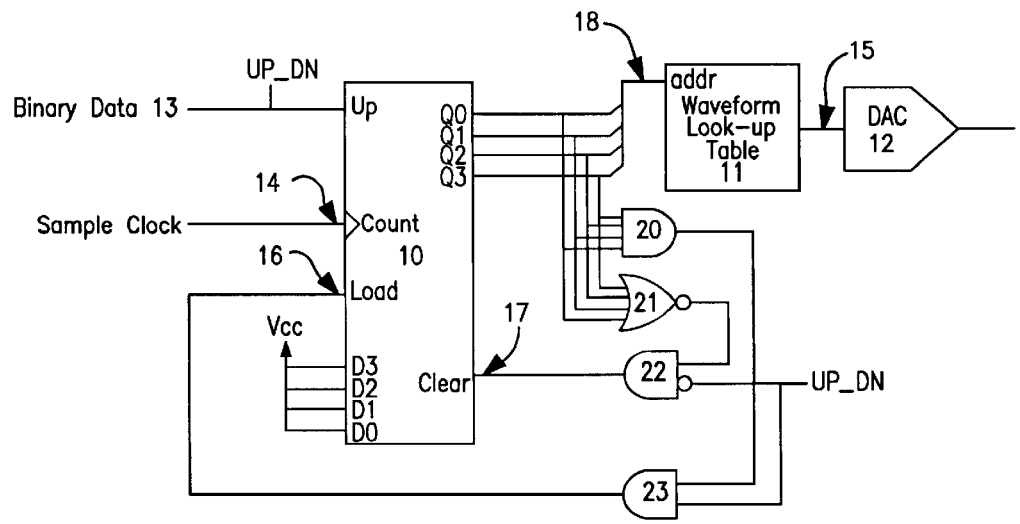
FIG. 1 is a schematic block diagram of one embodiment of the invention, whereby a binary data input signal is converted to a shaped analog data signal.

While this invention is susceptible to embodiment in many different forms, there are shown in the drawings and will be described in detail herein several specific embodiments, with the understanding that the present disclosure is to be considered as an exemplification of the principles of the invention and is not intended to limit the invention to embodiments illustrated.

FIG. 1 of the drawings illustrates a first embodiment of the present invention. The invention includes a binary input signal 13 to the direction input of a 4-bit up/down counter 10. The binary input signal will typically be received from a connection between an outside circuit or component and counter 10.

Up/down counter 10 in the embodiment of FIG. 1 also includes a count input 14 operatively connected to a sample clock signal. Similar to the binary input signal, the sample clock signal will typically be received from a connection between an outside circuit or component to counter 10. To ensure stable circuitry timing, the sample clock frequency will normally be an integer multiple of the binary input data rate. The sample clock frequency also determines the sample rate of the digitized output signal 15.

The normal operation of counter 10 in the preferred embodiment is such that it changes its stored state at each rising edge of the sample clock signal. If the direction input is in a logic high state when the count input is triggered, the stored state of the counter increases by one. If the direction input is in a logic low state when the count input is triggered, the stored state of the counter decreases by one.

Counter 10 also includes load and clear inputs, 16 and 17. When the load input of counter 10 is in a logic high state, the internal state of the counter is set to the values appearing at inputs D0–D3. When the clear input is in a logic high state, the internal state of the counter is set to all zeros.

The internal state of counter 10 is output on lines Q0–Q3. These outputs are operatively connected to the address line inputs 18 of waveform lookup table 11. Lookup table 11 contains predetermined values stored at various addresses. In a preferred embodiment, the values stored in lookup table 11 when taken sequentially in time in order of increasing address, form a signal representing the output of a Gaussian filter following a positive-going step function input. However, other predetermined values may be substituted as desired in a particular application of the invention. The output 15 of lookup table 11 is the digital value corresponding to the contents of the address location specified by the address line inputs.

The output 15 of lookup table 11 can be optionally connected to digital-to-analog converter circuit 12 if a shaped signal is desired in the analog domain. The design of the digital-to-analog converter circuit 12 will depend on the details of the design implementation, such as data rate or performance requirements, as is well known in the art.

Logic gates 20 and 23 serve to ensure that when the counter is in its maximum state and the direction input indicates upward counting, the counter remains in its maximum state. Counter output lines Q0–Q3 comprise the four inputs to AND gate 20. Consequently, when the counter is in its maximum state, lines Q0–Q3 are high, and the output of AND gate 20 is also high. The output of AND gate 20 and the direction input line of counter 10 comprise the two inputs of AND gate 23. When both of these inputs are high, the output of AND gate 23 is high, which is connected to the load input of counter 10. When the counter 10 load input is high, the state of counter 10 is set to the state of inputs D0–D3, which in this embodiment are all pulled high, and counter 10 is maintained in its maximum state in which all four bits are high.

Logic gates 21 and 22 serve to ensure that when counter 10 is in its minimum state and the direction input indicates downward counting, the counter remains in its minimum state. Counter output lines Q0–Q3 comprise the four inputs to NOR gate 21. Consequently, when the counter is in its minimum state, and lines Q0–Q3 are all low, the output of NOR gate 21 is high. The output of NOR gate 21 and the inverted direction input line of counter 10 comprise the two inputs of AND gate 22. The output of AND gate 22 is connected to the clear input of counter 10. Consequently, when AND gate 22 goes high, the counter state is cleared and reset to all zeros, and counter 10 is maintained in its minimum state.

Figure 2:
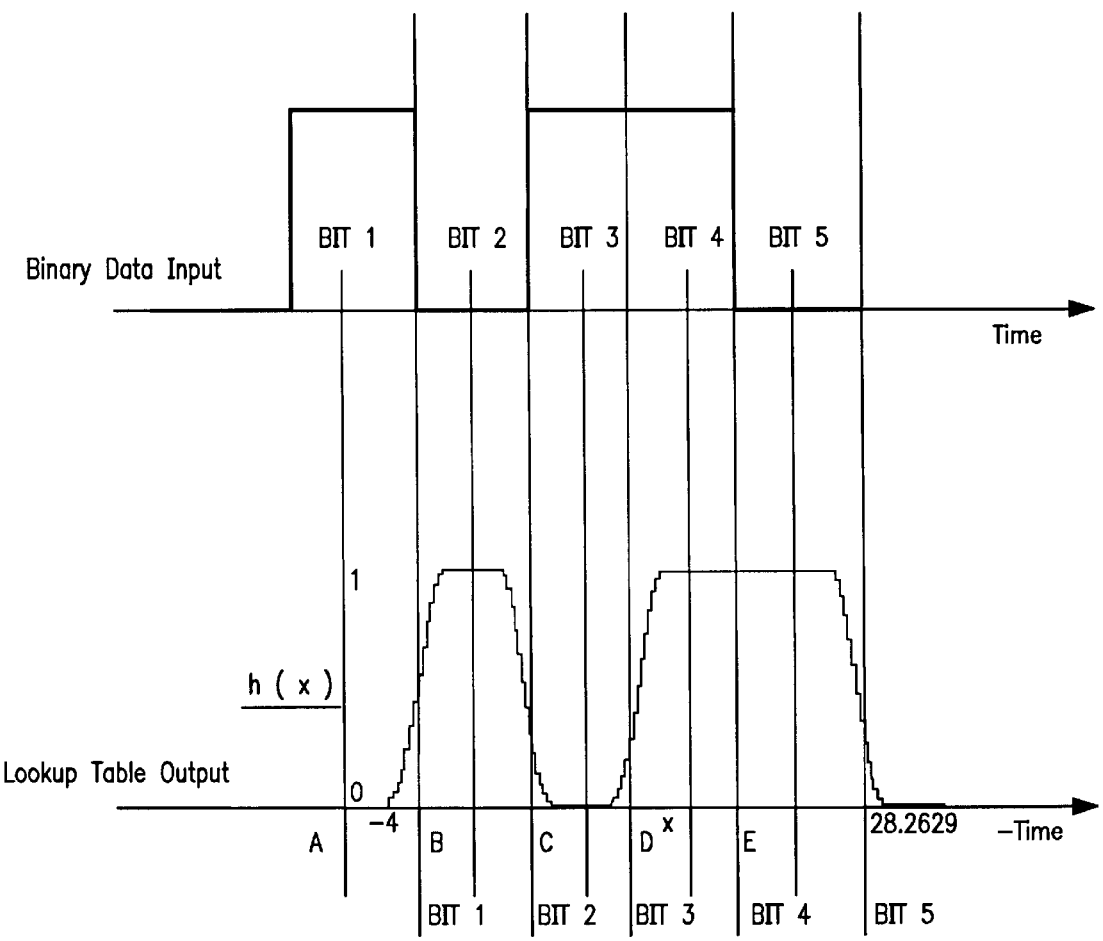
FIG. 2 is a graph of signal magnitude versus time for the input and output of one potential embodiment of the apparatus.

The resulting operation of the embodiment depicted in FIG. 1 is demonstrated by the example graphs of FIG. 2. In the example of FIG. 2, counter 10 begins in a cleared zero state. As illustrated, the first bit of the binary input data is a logic high. Consequently, as the sample clock signal triggers the count input of counter 10, the direction input is logic high. The counter begins incrementing its state, and sequentially addressing values in lookup table 11. Partway through segment B illustrated in the graph of the lookup table output, the counter reaches its maximum value. Thereafter, while the binary data input remains logic high, logic gates 20 and 23 operate to cause counter 10 to continuously reload its maximum state, thereby freezing the counter output and consequently the lookup table address, ensuring a constant lookup table 11 output. When the binary data input is switched to a low logic level, the apparatus operates similarly but in reverse. Counter 10 decrements its state upon each triggering of the count input by the sample clock signal, sequentially lower addresses are addressed in lookup table 11, and the output decreases progressively, as depicted in segment C of FIG. 2. If the counter reaches its minimum state and the binary data input remains low, logic gates 21 and 22 operate to maintain the counter in its minimum state as previously explained.

While FIG. 1 depicts a preferred embodiment of the invention, it is envisioned that somewhat varying circuit designs can be used to apply the invention, without departing from its scope. For instance, different types of up/down counters could be implemented in the invention. Furthermore, the number of counter bits and the predetermined floor and ceiling counter states could be varied as desired by one of ordinary skill in the art.

Figure 3:
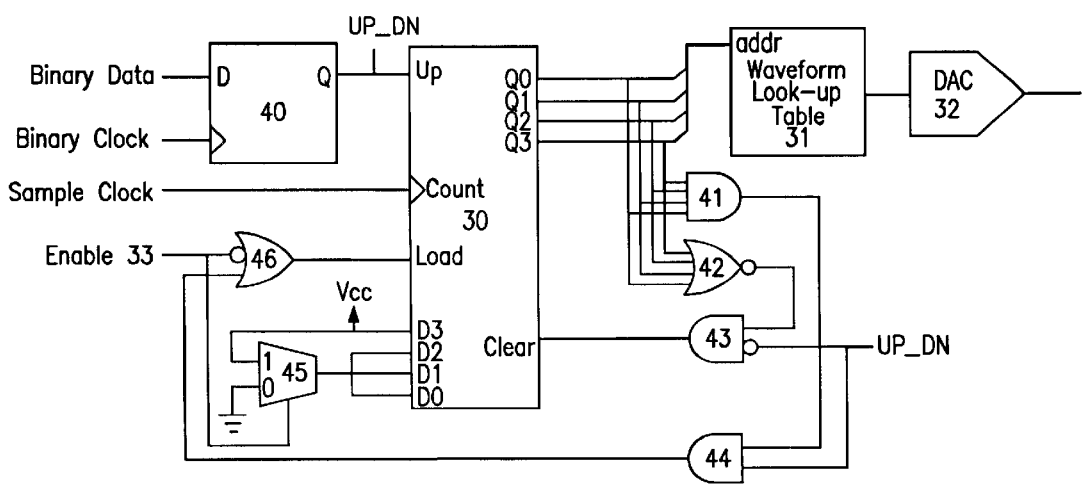
FIG. 3 is a schematic block diagram of another embodiment of the invention, whereby the apparatus can be alternatively enabled or disabled.

The embodiment of FIG. 3 depicts an additional feature of the invention. Its operation will be described to the extent that it varies from that of FIG. 1. The embodiment of FIG. 3 includes a means for providing an enable signal 33, whereby the apparatus can be alternatively placed into an activated or deactivated state. The means for providing an enable signal 33 will commonly comprise a connection from another circuit that is designed to control the activation of the apparatus.

The enable signal 33 is connected to an inverting input of logic OR gate 46, and 2:1 multiplexer 45. When the enable signal is placed in its activated state, which in the embodiment illustrated corresponds to a logic high level, logic OR gate 46 is unaffected, and a logic high signal originating from AND gate 44 will pass through OR gate 46 to the load input of counter 30 when the counter reaches its maximum limit, as determined by AND gates 41 and 44 analogous to the embodiment of FIG. 1. When a load signal is applied to counter 30 while the enable signal remains activated, the enable signal selects a first input of multiplexer 45, which is tied to a logic high level, thereby applying the desired maximum state to counter 30 inputs D0–D3.

When the enable signal is placed in its inactivated state, which in this embodiment is a logic low level, the output of OR gate 46 necessarily goes high and counter 30 will be forced into a loading condition. The enable signal also selects the second input of multiplexer 45, which is tied to a logic low level, thereby applying a desired fixed state to counter 30 inputs D0–D3 to be loaded while the apparatus is held inactive. In this embodiment, the state loaded while the apparatus is inactive corresponds to a halfway point between the countess minimum and maximum states, thereby allowing the apparatus output to rapidly achieve its correct steady-state position upon its subsequent enabling, regardless of the input state at the time of enabling. In many applications it is desirable to change from an activated to a deactivated state only while the counter occupies the desired steady-state value during normal operation. Deactivating the device while the counter occupies other values can cause significant discontinuities in the output signal, as the counter jumps to the steady-state value. In the aforementioned wireless radio transmitter context, as an example, such discontinuities may generate unacceptable frequency content in the transmitted signal.

While not essential to the operation of the invention, FIG. 3 also depicts flip flop 40. Flip flop 40 is provided in the illustrated embodiment to adjust the timing between the invention input signal and output signal, while also acting as an input buffer.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

What is claimed is:

1. An apparatus for generating a shaped waveform derived from a binary input signal, comprising:

a binary input signal;

a sample clock signal;

a counter circuit which outputs a state and is capable of incrementing or decrementing its state throughout a predetermined range of minimum and maximum values, and which counter circuit further contains a direction input electrically connected to the binary input signal, and a count input electrically connected to the sample clock signal, such that the state of the counter increases each time the counter is triggered by the sample clock signal when the direction input is in a first state, and such that the state of the counter decreases each time the counter is triggered by the sample clock signal when the direction input is in a second state different from the first state, except when the counter is in its minimum state and the direction input indicates downward counting, in which case the counter remains in its minimum state, or when the counter is in its maximum state and the direction input indicates upward counting, in which case the counter remains in its maximum state;

a lookup table, which stores addressable predetermined data values and includes an address input responsive to the counter circuit output, whereby the lookup table circuit outputs a predetermined data value associated with the address input value.

2. The apparatus of claim 1, in which the predetermined data values contained by the lookup table circuit represent the predetermined response of a filter to a step-function binary state transition, whereby the output of the apparatus is a series of values representative of the binary input data signal after processing by a filter.

3. The apparatus of claim 1, further containing a digital-to-analog conversion circuit, with input electrically connected to the lookup table circuit output, whereby the apparatus outputs an analog shaped waveform derived from the binary digital input signal.

4. The apparatus of claim 1, which further includes a means for supplying an enable signal which is alternatively in an enabled or disabled state, and in which the apparatus output is responsive to the enable signal, such that the apparatus outputs a fixed predetermined value when the enable signal is in the disabled state.

5. The apparatus of claim 4, in which the counter circuit is electrically connected to the enable signal, and the counter circuit state is set to a fixed predetermined value when the enable signal is in the disabled state, whereby the apparatus consequently outputs a fixed predetermined value.

6. An apparatus for generating a shaped waveform derived from a binary input signal, comprising:

a sample clock signal;

an up-down counter capable of incrementing and decrementing throughout a predetermined range of minimum and maximum values, in response to inputs including the binary input signal and the sample clock signal;

a lookup table containing addressable predetermined data values and address input responsive to the output of the counter, whereby the lookup table circuit outputs a predetermined data value associated with the address input value.

* * * * *